United States Patent Office 3,309,684
Patented Mar. 14, 1967

3,309,684
BIO-INSTRUMENTATION MONITORING AND
DISPLAY DEVICE
Elliott H. Kahn, Brooklyn, William M. Nelson, Flushing, and Samuel Stempler, Brooklyn, N.Y., assignors, by mesne assignments, to the United States of America as represented by the Secretary of the Navy
Filed June 9, 1964, Ser. No. 373,894
2 Claims. (Cl. 340—213)

The invention relates to a bio-instrumentation monitoring and display device and is designed to monitor the environment within altitude simulation chambers and to alert the chamber operator of the existence of conditions that are hazardous to the chamber occupants. Specifically, the device continuously monitors and displays the following: percent oxygen, percent carbon dioxide, percent carbon monoxide, temperature, humidty, pressure/altitude, and duration of exposure. Danger levels are set for oxygen, carbon dioxide, and carbon monoxide as a function of pressure/altitude and duration of exposure; when these levels are exceeded, suitable alarms are energized. Temperature and humidity are combined by a novel formula to yield THI, which is also displayed continuously. When the THI reaches a hazardous level, as a function of duration of exposure, similar alarms are energized.

In addition, two or more environmental components, each one below the hazardous level, may act in concert to endanger the chamber occupant. This is termed a syngergistic effect; it is computed by the device, which will energize appropriate alarms when the effect attains a hazardous level.

In pursuit of the nation's military and space goals, the physiological and psychlogical demands placed upon the human participant in the aerospace mission have increased, as he is called upon to spend extended periods of time in what is, at best, an unfamiliar environment. The response of the human to such environments is not fully known, nor can it be known with complete certainty except by sending statistically significant numbers of people into space. Since this is clearly impossible, the next solution is in the ground simulation of various aerospace environments, both to test the human's response to the environmental stresses, and perhaps to acclimatize him to such stresses. In the testing and acclimatization of human beings, the altitude (pressure) chamber has played a leading role.

The use of such chambers, to any great extent was initiated during World War II, to train pilots and other flight personnel in the then advanced aircraft environment; and since that time altitude chambers have seen many refinements, including programmed altitude changes, programmed temperature changes, etc. Personnel in the chamber may be clothed and equipped as for actual flight (including conventional oxygen masks), and may also use special equipment, including biological transducers, for aeromedical research. With such tools, the reactions of men to flight conditions have been recorded and analyzed, and the medical art has been greatly enriched with the resultant physiological data.

However, in the observation of the man in the chamber, the chief variables have been the pressure (altitude) and the temperature, on the one hand, and the energy expended (work done) by the subject on the other. Environmental constituents other than temperature and pressure have tended to be neglected, or have been introduced on an individual, unintegrated basis. Such other environmental constituents are primarily the composition of the gas (air) within the chamber; and as man's excursions through space increase in frequency and duration, the astronaut will find himself more and more living in what is essentially a closed flying altitude chamber, in which the gas composition is equally as important as the other portions of the environment.

The need for a more detailed and integrated reproduction of the chamber environment, one able to indicate all of the individual environmental components, and one that could also integrate and predict the combined effect of these components upon the human occupants of this chamber is now provided by the device of the invention.

It is therefore an important object of the invention to integrate basic parameters of environmental factors to produce a practically instantaneous indication of certain human physiological stress factors.

It is another object to establish which constituents of the ambient atmosphere in altitude chambers could have, under any anticipated circumstances, an adverse effect on the chamber occupants.

It is yet another object to establish the quantitative levels at which these gases would individually present a biological hazard to the chamber occupants.

It is still yet another object to establish quantitatively the effect of altitude (pressure) and duration of exposure on the toxic level of the gas constituents.

And it is another object to establish quantitatively the level at which the combination of temperature and humidity (THI index) would prove intolerable to the human occupants of the champer—also as a function of altitude and duration of exposure, as necessary.

A further object is to establish a quantitative expression that would signify when any two or more of these environmental factors (gas concentration, THI, pressure, and duration of exposure) act in concert to present a hazard to the chamber occupants, even though the factors are individually at safe levels.

And a still further object is to design and build instrumentation capable of continuously monitoring all of these environmental factors, of indicating when potentially dangerous levels are reached (either individually or in concert), and of alerting the chamber operator to the existence of these conditions.

And an additional object is to provide a device that is capable of expanding its utility with slight modification and is also readily adapted to use in conjunction with other instruments.

Other objects and many of the attendant advantages of this invention will be readily aprpeciated as the same becomes better understood by reference to the following detailed description when considered in connection with the accompanying drawings wherein.

Figure 1A:
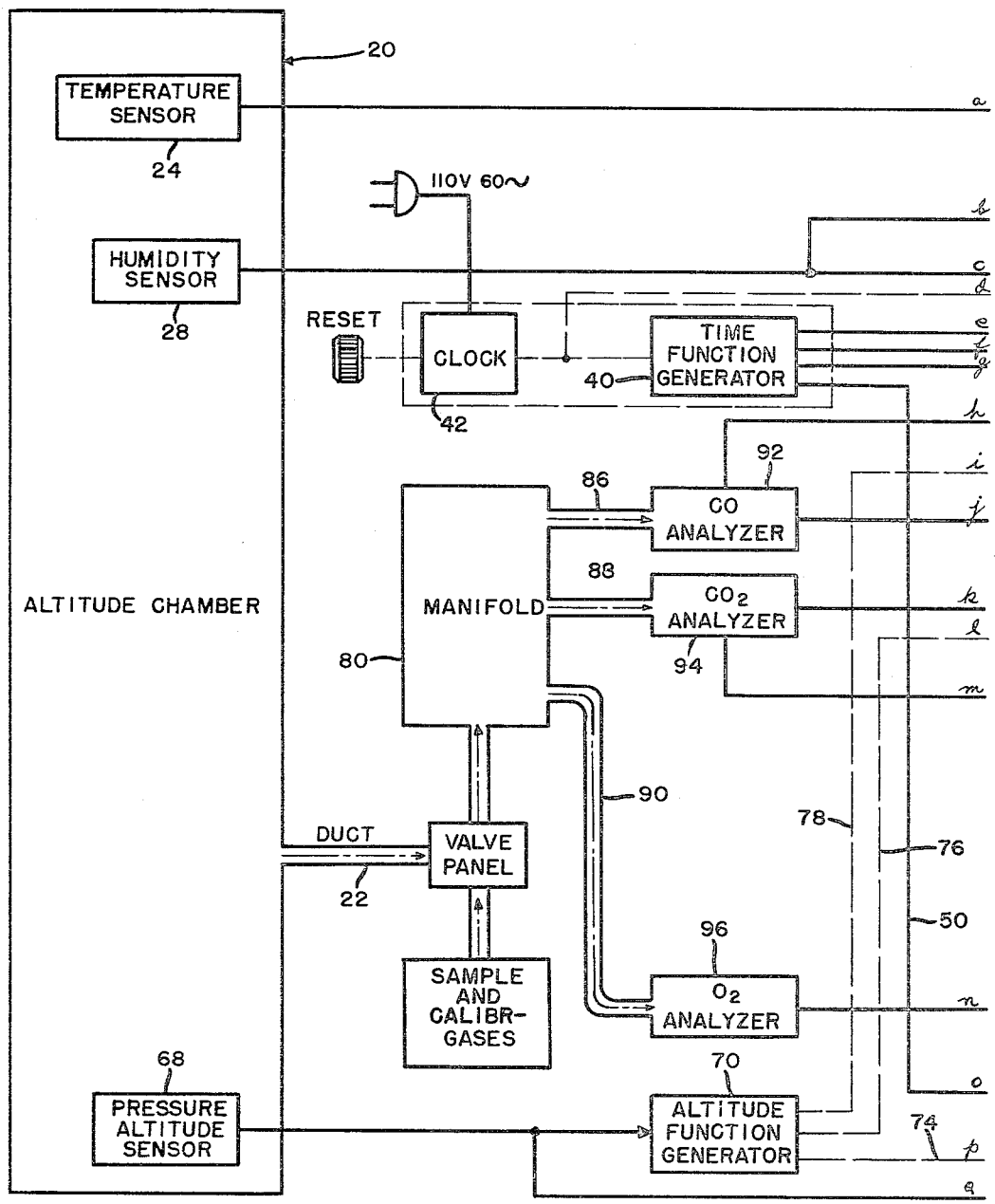
FIGS. 1a, 1b and 1c is a block diagram of the device of the invention.

The necessity for an alarm warning system for men in space travel is apparent as fatigue and environmental factors play an important part.

The physiological status of a man at any one time is a function of his general health, the activity in which he is engaged, and the environment in which he is operating. However, a basic assumption of this invention is that, if the first two factors are known, the physiological status of the man can be derived from a knowledge of his environment.

The environment within an altitude chamber can be broken down into several constituents: the gas environment (oxygen, carbon dioxide, etc.), temperature, humidity and pressure/altitude. The effect on humans of "abnormalities" in any of these constituents has long been known and it was found desirable to describe these effects quantitatively, in terms of danger and safe levels.

A brief description of some of the physiological processes in man is of value to better understand the problems involved. The respiratory system requires the greatest attention. The respiratory system is concerned with the following functions; intake of the ambient gases into the lungs; mixing of gases in the lungs; diffusion of gases into the blood; transportation of waste gases to the lungs; diffusion of waste gases into the lungs; and expulsion of the waste gases out of the lungs.

The first important fact is that the ambient gases, when inhaled, do not represent the total mixture of gases within the lungs. Even in deepest breathing, the air in the lungs is not wholly replaced; rather, the inhaled volume, or tidal air (which ranges in the average person from 500 milliliters to 2000 milliliters in deep breathing), is intermixed with approximately 1500 milliliters of air already in the lungs—the functional reserve. The size of the functional reserve is a large factor in the mixing of gases in the lungs.

Once in the lungs, the gas is diffused through the tissues and brought into contact with the blood; where the intrinsic rate of diffusion of any substance is a function of its solubility and molecular weight, and the permeability of the medium.

Having been brought into contact with the blood, the gases (that is, the $O_2$) must be transported by the blood to the cells. This is done by the $O_2$ combining with the hemoglobin in the blood to yield oxyhemoglobin ($HbO_2$), in which form the $O_2$ is delivered to the cells and extracted there. However, the union of the $O_2$ with the Hb is regulated by the partial pressure of oxygen ($pO_2$)—which is equivalent to the number of $O_2$ molecules for a given volume. Note that it is not the percentage of $O_2$ in the ambient atmosphere that is significant, but the partial pressure. That is, although the percentage of $O_2$ at 30,000 feet is approximately the same as that at sea level (21 percent), the partial pressure at 30,000 is much lower. Thus the saturation of the Hb with the $O_2$ is much lower, less oxygen is delivered to the tissues, and the individual at 30,000 feet exhibits all the symptoms of oxygen deficiency.

Further, it should be noted that the affinity of CO with Hb is 200 to 300 times greater than that of $O_2$. This would make the existence of CO in the inspired atmosphere very dangerous if it were present in more than the normal trace quantities.

Figure 2:
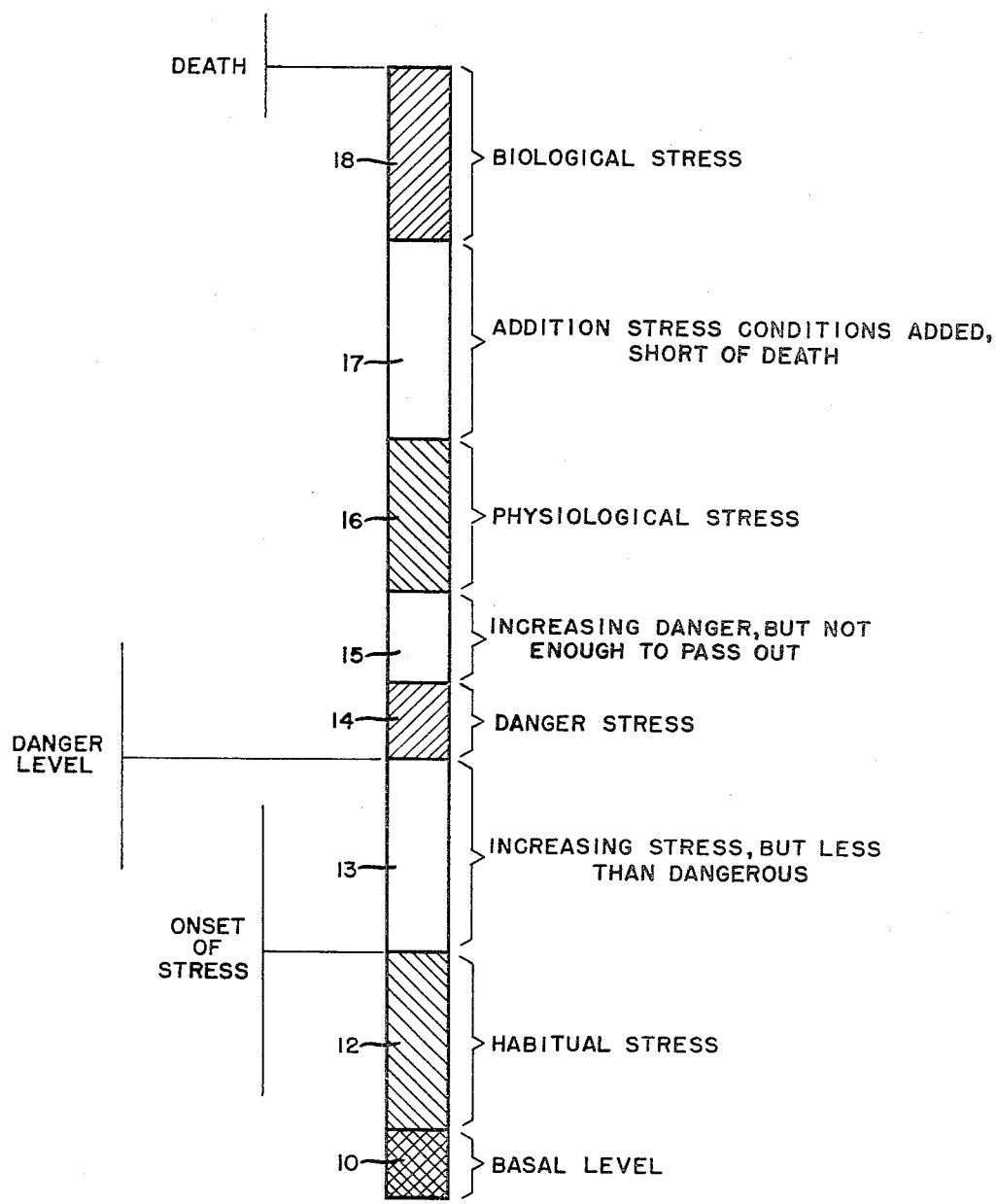
FIG. 2 is a pictorial representation of the "stress" conditions encountered.

In order to establish quantitative values of danger and safe levels that are capable of physical implementation, criteria of "safe" and "dangerous" must be defined. To this end, the concept of stress was developed. FIG. 2 is a pictorial representation of the concepts proposed. It delineates the range of human response as the combination of environmental factors and bodily activity varies in the direction of increasing stress. Thus, at the lowest range of activity, and with a benign environment, the basal level 10 is defined. Above the basal is a range of habitual, or normal, stress 12. This represents the activity, in a benign environment, that is both normal and mandatory for a healthy person. That is, although walking, sitting, eating, and similar activities act as stresses in the sense that respiration, blood volume, etc. are increased over the basal rate, such activity is necessary for proper body development and normal physiological functioning. It is also known that, at this level, there are no perceptible underisable effects on the body. Thus, until the environment/activity combination reaches an "onset of stress" level, no apparent physiological compensatory mechanism is triggered.

At increasing stress levels, physco-physiological factors increase the demands on the body's compensatory response, and is a region where stress can be applied which is above normal, but less than dangerous. This is shown at 13. When a point is reached wherein the proper functioning and judgment of the person is impaired, this is defined as the danger stress 14, and varies somewhat from person to person, with the danger level being defined as the concentration level that represents the danger stress, considering individual tolerances and safety factors. (It should be appreciated that the danger level for a pilot flying an aircraft is different from that of a passenger, and is related to the activity being performed.) As stress continues, the danger level begins to be exceeded, for a period of time before the person will pass out, and this time interval is illustrated at 15. Further increase in stress results after a while, in the onset of a period of physiological stress 16, which occurs after the normal compensatory states are exceeded. Although such a physiological reaction as fainting may occur, no irreversible damage may yet be produced.

After unconsciousness, an additional amount of gas concentration may be consumed for a short time without death occurring. This is illustrated at 17. As the stress increases, eventually a point is reached wherein irreversible tissue damage occurs, eventually leading to death. This region of irreversible damage is defined as biological stress and is graphically illustrated at 18. The extent of the region between physiological stress and biological stress varies, and is dependent upon the particular toxic agent considered. Also, the graph is a pictorial representation and in fact, no sharp lines of demarcation exist.

In order to recognize such stresses during a training mission and to warn the test operators, these environmental constituents must be monitored. The total environment within an altitude chamber encompasses the gas environment, temperature, humidity, and pressure. Under normal conditions, the gas environment consists of the following components: nitrogen (approximately 78 percent), oxygen (approximately 21 percent), and carbon dioxide (approximately 0.03 percent), with the remainder being various trace gases, including carbon monoxide.

Of the three main gases listed above, nitrogen is the least important, since it enters into no significant chemical reactions with the body tissues. It does dissolve in the blood; and if the rate of pressure decrease is too great, it may diffuse out too rapidly, causing aeroembolism (the "bends"). However, since the equipment is designed for a specified, safe rate of pressure decrease, this effect can be neglected. Hence, nitrogen is not monitored by the system.

Oxygen is the most important gas in the atmosphere, and clearly must be monitored.

Carbon dioxide is the primary waste gas produced by the body; in addition, it plays a significant role in the process of respiration. Generally, the greater the concentration of $CO_2$, the greater will be the tendency toward hyperventilation (deep, rapid breathing); in fact, the respiratory system appears to be governed more by the necessity of eliminating $CO_2$ than by the need of taking in $O_2$. Consequently, $CO_2$ is monitored.

Of the remaining gases in the chamber, they can be normal components of the atmosphere, or can be produced either by electronic and other equipment or by human processes. Gases and effluent produced by equipment and human processes were evaluated over periods from six hours to eight days, and found to be present in negligible quantities in properly designed closed chambers. Accordingly, these gases are not monitored. Further, of the trace gases normally present in the atmosphere, only carbon monoxide could be important, since its presence in greater than trace amounts could be dangerous, and since abnormally high concentrations could exist in areas where altitude chambers may be located. Thus, of the trace gases, only CO is monitored.

With regard to temperature and humidity, it is known that, all other factors held constant, the body heat balance is largely related to the environmental temperature (radiation, convection, and conduction exchanges), together with humidity and air movement (evaporation of water). In itself, temperature affects the red cell count, blood volume, and other bodily functions; however, the combination of temperature and relative humidity affords a more comprehensive picture of the physiological reactions. This combination is expressed as the temperature-humidity index (THI), and excessive values of THI can produce severe physiological reactions. These include heat prostration, which is usually transient and not serious; heat stroke, in which the body's heat-regulating mechanism appears to break down completely, and for which the mortality rate may be as high as 20 percent; and heat cramps (stoker's cramps), which may last for hours or days. As a consequence, both temperature and humidity are monitored, and from these quantities a simple analog computing network derives the THI.

Pressure/altitude, has an important effect upon the partial pressures of the gases, which in turn is related to the $O_2$ supplied to the issues. Consequently, pressure/altitude within the chamber is monitored.

In addition to the specifically environmental constituents described above, the duration of exposure to a stress-producing factor is clearly of importance, consequently, elapsed time in the chamber is monitored.

In summary then, the following quantities are continuously monitored: percent $O_2$, percent $CO_2$, percent CO, temperature, humidity, pressure/altitude, and elapsed time of exposure.

From the preceding discussion, is it clear that the primary effects on the body are produced by the three gases mentioned and the THI, and that pressure/altitude and duration of exposure are important insofar as they contribute to these effects. It is also clear that the effects of the three gases are a function of both pressure/altitude and time, and that the effects of THI are a function of time.

Figure 1B:
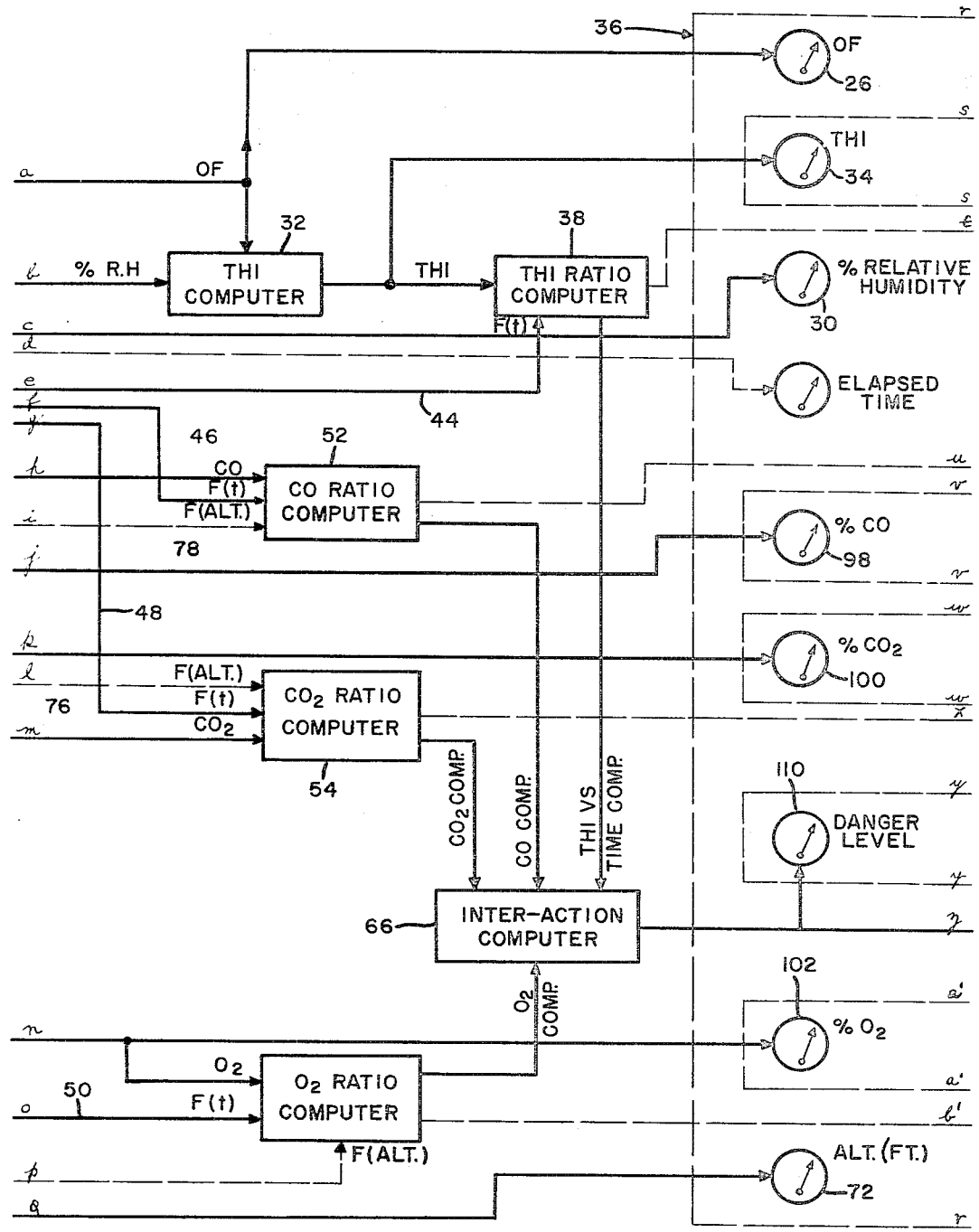
Figure 1C:
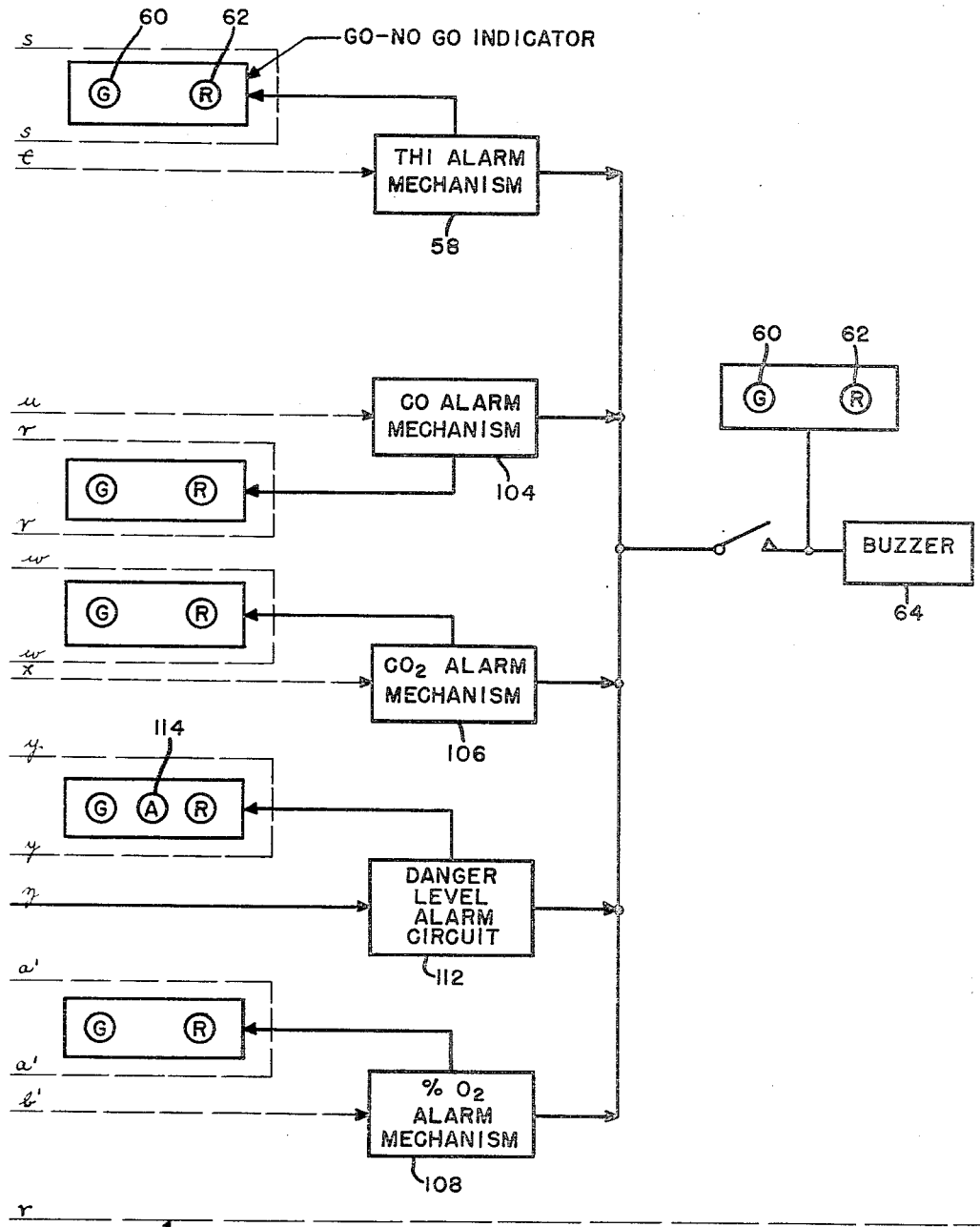

Referring to FIGS. 1a, 1b, and 1c, an altitude chamber 20 is shown. The chamber 20 includes the three sensors mounted within, plus a duct 22 leading eventually to the gas analysis instruments. The sensor assembly is placed inside the environmental chamber. It contains transducers for temperature, humidity, and pressure/altitude, which are electrically connected to a chassis-mount connector. The temperature sensor is a resistance thermometer type; the pressure (altitude) in the test chamber is sensed by a bellows type of pressure transducer; and relative humidity is sensed by an electric hygrometer. These are purchased and form no part of the invention. The output of the temperature sensor 24, a voltage, is fed driectly to a console panel meter 26, to provide a continuous indication of temperature within the chamber. It is also fed to the THI computer 32. Similarly, the output of the humidity sensor 28, also a voltage, is fed to a console meter 30 that indicates the relative humidity within the chamber, and the THI computer 32. From the voltage equivalents of temperature and relative humidity, the THI computer computes the THI within the chamber, and transmits its output to two locations. The first is to the THI meter 34 on the console panel 36 and the other is to the THI ratio computer 38.

Also fed to the THI ratio computer 38 is the output of the time function generator 40. The time function generator 40 consists basically of a clock 42 that drives four potentiometers, one for each of the four quantities of interest. Thus, the potentiometer 44 feeds the THI ratio computer 38, while the potentiometers 46, 48, and 50 feed the CO ratio computer 52, the $CO_2$ ratio computer 54 and the $O_2$ ratio computer 56, respectively. The potentiometer provides the allowable values, as a function of time, for computation of the individual stress ratios. The THI ratio computer 38 now compares the actual value of THI within the chamber to the allowable THI value as derived from the time function generator 40. The output of the THI ratio computer is fed to the THI alarm mechanism 58. If the THI is at a safe level the green lamp 60 will be lit; if the THI is at an unsafe level, the red lamp 62 will be lit and a buzzer 64 will sound. The THI ratio computer output is also fed to the interaction computer 66, where it enters into the synergism equation of:

$$R_{O2} + R_{CO2} + R_{CO} + R_{(THI)}4 = 1$$

Where $R$ = stress ratio.

The third sensor within the chamber 20 is the pressure/altitude transducer 68. Its output, a voltage, is fed to the altitude computer 70, from which a signal is fed to a console meter 72 to provide a continuous indication of pressure/altitude within the chamber. The altitude computer 70 is a servo that converts pressure to altitude. Coupled to the output shaft are the wipers 74, 76 and 78 of three potentiometers, for the three gases monitored. The wiper position, determined by the altitude computer, represents the appropriate altitude correction factors.

For gas analysis, a sample of the atmosphere within the chamber is continuously pumped out of the chamber through duct 22 and, through the valve panel 82 into a manifold. Also connected to the valve panel are cylinders 82 containing the gases used for calibrating the gas analyzers. In operation, either the chamber atmosphere or the calibrating gases will be allowed into the manifold, but not both. From the manifold 80 the chamber gas is pumped via the ducts 86, 88 and 90 through the gas analyzers 92, 94 and 96, respectively and then returned to the chamber (not shown) so as not to alter the chamber environment. The CO and $CO_2$ analyzers are commercially available and consist of an analyzer unit and an amplifier unit. The rate of gas flow is visually indicated. The $O_2$ analyzer is also commercially available and includes an analyzer and a calibration panel.

As can be seen, the output of each analyzer is fed to two locations. One is an appropriate console meter, to provide a continuous display of the percent concentration of the gas; the other location is the appropriate ratio computer. Thus, the CO analyzer 92 sends a signal to the computer 54 and another signal to the meter 98 on the console 36. Similarly, the $CO_2$ analyzer 94 sends a signal to the ratio computer 54 and to the meter 100; where the $O_2$ analyzer 96 sends a signal to the $O_2$ ratio computer 56 and to the meter 100. To each appropriate gas ratio computer are also fed the proper altitude correction factors 74, 76 and 78 respectively, and the proper time correction factors 46, 48 and 50. As with the THI ratio computer, the gas ratio computers 52, 54 and 56 then compare the actual concentrations of gas components within the chamber with the allowable values, and transmit an output to the appropriate alarm mechanisms 104, 106 and 108 and to the interaction computer 66. As long as the individual gas concentration is at a safe level the associated green lamp 60 remains lit; as soon as any concentration reaches a danger level, the associated red lamp 62 is lit (the green lamp extinguishes), and the buzzer 64 sounds.

It should be observed that the outputs of the four ratio computers (THI, $O_2$, $CO_2$ and CO) are fed to the interaction computer 66. In the interaction computer the values are summed, according to the synergism equation, and an output is transmitted to the console DANGER LEVEL meter 110 and the danger level arm circuitry 112. As long as the danger level is less than 0.9, the green lamp 60 is lit. At a danger level of 0.9 the green lamp extinguishes and the amber lamp 114 glows; at a value of unity or greater the amber lamp extinguishes, the red lamp 62 glows, and the buzzer 64 sounds.

A novel feature of the invention should be noted. If the three gas concentrations, and the THI, are all below the danger level, but their combined effect would create a hazard to the chamber personnel, only the danger level alarm circuitry 112 would be energized; the displays associated with each of these quantities individually would still indicate a safe level. However, should any single quantity exceed the safe level, both its alarm circuitry and the danger level alarm circuitry would be energized. The chamber operator can then determine whether the stress on the chamber occupants is largely synergistic or largely due to a single factor, and can take whatever action is deemed appropriate.

Obviously many modifications and variations of the present invention are possible in the light of the above teachings. It is therefore to be understood that within the scope of the appended claims the invention may be practiced otherwise than as specifically described.

What is claimed is:
1. Bio-instrumentation apparatus comprising:
   an environmental chamber;
   a plurality of environmental sensing and analyzing means connected to said chamber for providing a plurality of output signals each corresponding to an actual environmental parameter in said chamber including THI, carbon monoxide, carbon dioxide, oxygen, and altitude pressure conditions;
   clock driven function generator means for providing a plurality of reference signals each representing the allowable value of one of said THI, carbon monoxide, carbon dioxide, and oxygen conditions as a function of time;
   altitude function generator means responsive to the output signal corresponding to said altitude pressure condition to provide an altitude correction signal;
   THI, carbon monoxide, carbon dioxide, and oxygen ratio computers connected to said sensing and analyzing means, to said time function generator and to said altitude function generator, said ratio computers being operative to compare said output signals of said sensing and analyzing means to said reference signals and responsive to said altitude correction signals to provide a ratio signal for each of said THI, carbon monoxide, carbon dioxide, and oxygen conditions representative of stress therefrom; and
   warning means connected to said ratio computers and responsive to said ratio signals to provide a warning signal when a predetermined condition of stress is exceeded for any one of said parameters.

2. Apparatus as defined in claim 1 and further comprising:
   an interaction computer, said interaction computer being connected to receive a ratio signal from each of said ratio computers;
   said interaction computer comprising summing means for summing said ratio signals and providing an alarm signal when the sum thereof exceeds a predetermined value; and
   indicator means actuable by said alarm signal.

References Cited by the Examiner
UNITED STATES PATENTS

| | | | |
|---|---|---|---|
| 2,915,898 | 12/1959 | Van Luik | 73—338.3 |
| 3,139,085 | 6/1964 | Custance et al. | |
| 3,177,138 | 4/1965 | Larrison | 73—23.1 X |
| 3,181,343 | 5/1965 | Fillon | 73—23 |
| 3,181,364 | 5/1965 | Barton | 73—342 |
| 3,242,327 | 3/1966 | Burk et al. | 235—183 |
| 3,232,712 | 2/1966 | Stearns | 340—237 X |

NEIL C. READ, *Primary Examiner.*

D. YUSKO, *Assistant Examiner.*